O. J. HARDGROVE.

Car-Brake Shoe.

No. 52,848.

Patented Feb. 27, 1866.

Witnesses,
R. T. Campbell
Edw. Schafer

Inventor
Orrick J. Hardgrove
per
Mason Fenwick Lawrence

UNITED STATES PATENT OFFICE.

O. J. HARDGROVE, OF CANTON, OHIO.

IMPROVED CAR-BRAKE.

Specification forming part of Letters Patent No. 52,848, dated February 27, 1866.

*To all whom it may concern:*

Be it known that I, ORRICK J. HARDGROVE, of Canton, in the county of Stark and State of Ohio, have invented a new and Improved Brake; and I do hereby declare that the following is a full, clear, and exact description thereof, reference being had to the accompanying drawings, making a part of this specification, in which—

Figure 1:
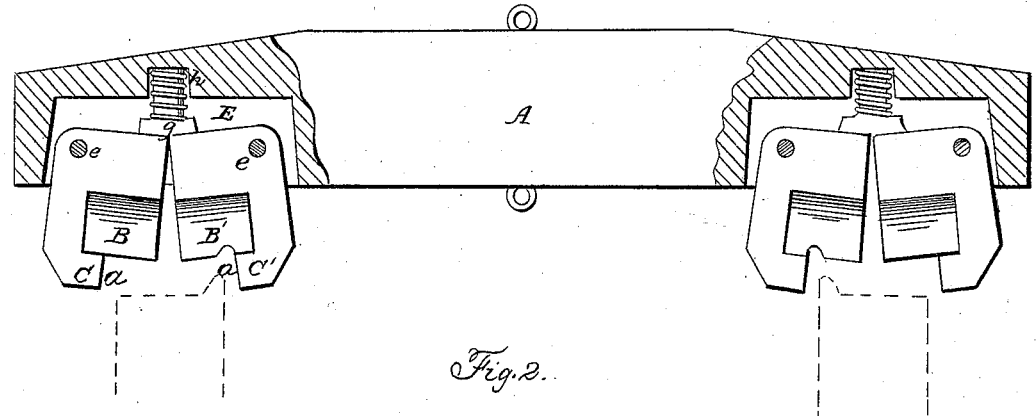
Figure 2:
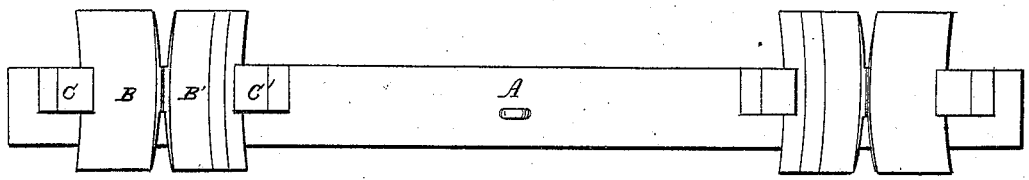
Figure 3:
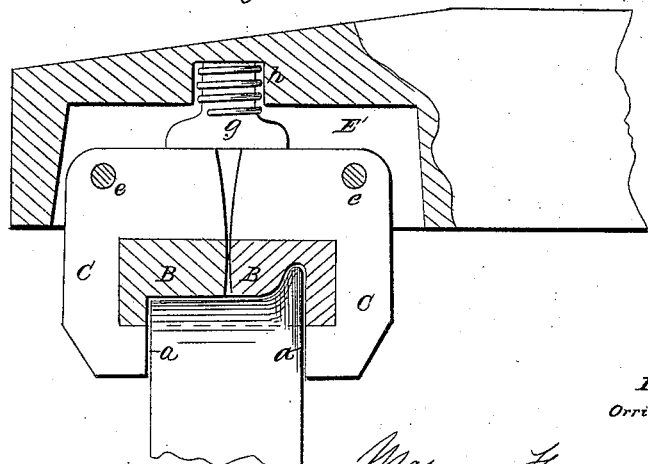

Figure 1 is a top view of my improved brake. Fig. 2 is a front view of the same. Fig. 3 is an enlarged sectional view of one of the brakes applied to a car-wheel.

Similar letters of reference indicate corresponding parts.

The object of this invention is to so construct a car or a wagon brake that when it is brought into operation the brake-shoes shall clasp the sides of the wheels and at the same time act with a yielding pressure upon the peripheries of the wheels, thus creating considerable friction thereupon without the expenditure of much power to apply the brakes, as will be hereinafter described.

To enable others skilled in the art to understand my invention, I will described its construction and operation.

In the accompanying drawings, A represents a horizontal brake-bar, which may be swung beneath the body of the car or wagon and connected to the truck-frame in the usual manner. To each end of this bar the brakes are applied, as shown in Figs. 1 and 2, and as the brakes on both ends of this bar are constructed exactly alike, I will proceed to describe those on one end.

B B' are the curved brake-shoes, which are shaped so as to conform to the periphery of the car-wheel when they are brought together, as shown in Fig. 3. The curved shoe B is adapted to press against a portion of the periphery of the wheel, and the curved shoe B' is adapted to press against the other portion of the tread of the wheel, together with the flange thereof. These curved shoes are suitably secured to or formed on horizontal clasps C C', the surfaces $a\ a$ of which are adapted to press upon the sides of the car-wheel at the same time that the shoes B B' act upon the tread of the wheel. The shoes and their clasps or clamps are pivoted in horizontal recess E in the bar A by means of the vertical pins or bolts $e\ e$, so that said shoes and clamps are allowed to vibrate or to open and close, as shown in Figs. 1 and 3.

Behind the shoes B B' is an india-rubber spring, $g$, which is made in the form of a T-head and let into a recess, $h$, formed in the bar A. This rubber spring bears against the back of the two shoes B B', so as to force their outer ends apart, as shown in Figs. 1 and 2.

To increase the power of the spring $g$, I coil a metal spring around its neck, as shown in Figs. 1 and 3. This reacts upon the enlarged head of the rubber spring and insures the opening of the brake-shoes and their clamps when the brakes are relieved from the wheels.

In practice the shoes and clamps will be supported when open by means of shoulders formed on them, which will abut against the forward edge of the brake-bar.

When the brake-bar A is moved toward the car-wheels the corners of the brake-shoes B B' will first impinge upon the peripheries of the wheels, and as further pressure is exerted the surfaces of the brake-shoes will be brought squarely against the peripheries of the wheels, which operation brings the clamping-surfaces $a\ a$ in contact with the sides of the wheels, as shown in Fig. 3. It will thus be seen that a great amount of friction-surface is presented to the sides and tread of the wheels, and at the same time the side brakes are made to operate as clamps, which gripe the sides of the wheels with a force which will vary in proportion as the pressure of the curved shoes upon the tread of the wheels is varied.

By my invention the very act of applying the shoes B B' to the wheels brings the side clamps into action, and hence very little expenditure of power is required to apply any desired amount of friction to the wheels to stop them.

To adapt my brake for wagons or carriages other than rail-cars it is only necessary to omit the indentation for the flange; but, if desirable, the curved surface may also be omitted. For buggies or wagons the face of the shoe may be from one-half an inch to four inches in thickness.

The clamps C C' and blocks B B' are to be constructed in one piece, if desirable, and the bearing-surface of the clamps may be as wide as the length of the blocks.

The box-chamber (represented in the drawings as formed in the brake-bar to receive the brake-blocks and springs) may consist of simply a groove or depression in or on the under side of the brake-bar.

The jaws of the brake can be thrown apart by an india-rubber or other spring inserted between them as well, or nearly so, as by the method shown in the drawings.

Having thus described my invention, I claim as new and desire to secure by Letters Patent—

1. Constructing a car or a wagon brake of two pivoted shoes, B B', which are provided with side clamps, $a$ $a$, and acted upon by means of a spring, $g$, or its equivalent, substantially as described.

2. The construction of each shoe B B' with a side clamp formed on it, substantially as described.

3. The combination of the T-head rubber spring $g$ and a coiled spring surrounding its neck, when these parts are applied to a two-part car-brake which is constructed substantially as described.

O. J. HARDGROVE.

Witnesses:
   GEO. W. RAFF,
   W. W. CLARK.